United States Patent
Chern et al.

(10) Patent No.: US 9,774,770 B2
(45) Date of Patent: Sep. 26, 2017

(54) OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 41 days.

(21) Appl. No.: 14/883,012

(22) Filed: Oct. 14, 2015

(65) Prior Publication Data
US 2016/0124196 A1 May 5, 2016

(30) Foreign Application Priority Data

Oct. 31, 2014 (TW) ............................. 103137847 A
Aug. 28, 2015 (CN) .......................... 2015 1 0541063

(51) Int. Cl.
| | |
|---|---|
| *H04N 5/225* | (2006.01) |
| *G02B 19/00* | (2006.01) |
| *G02B 13/00* | (2006.01) |
| *G02B 3/00* | (2006.01) |

(52) U.S. Cl.
CPC ......... *H04N 5/2253* (2013.01); *G02B 3/0043* (2013.01); *G02B 13/0085* (2013.01); *G02B 19/0085* (2013.01); *H04N 5/2254* (2013.01)

(58) Field of Classification Search
CPC .. H04N 5/2253; H04N 5/2254; G02B 3/0043; G02B 13/0085; G02B 19/0085; G02B 7/285; G02B 7/32; G02B 7/40; G03B 2215/05–2215/0596; G03B 15/02–15/05
See application file for complete search history.

(56) References Cited

U.S. PATENT DOCUMENTS

| | | | | |
|---|---|---|---|---|
| 7,242,027 | B2* | 7/2007 | Schranz | H01L 27/14621 257/225 |
| 8,823,859 | B2* | 9/2014 | Fujimori | H04N 5/335 348/211.2 |
| 2004/0132491 | A1* | 7/2004 | Kim | H04N 5/2256 455/556.1 |
| 2007/0206114 | A1* | 9/2007 | Tanaka | H04N 5/2256 348/371 |

(Continued)

*Primary Examiner* — Jason Flohre
(74) *Attorney, Agent, or Firm* — Muncy, Geissler, Olds & Lowe, P.C.

(57) ABSTRACT

An optical apparatus includes plural optical lens groups, an optical sensor, at least one lighting member and a casing. After a light beam passes through any of the plural optical lens groups, a travelling direction of the light beam is changed. After the light beam passes through at least one of the plural optical lens groups, the light beam is sensed and converted into an image signal by the optical sensor. The lighting member outputs a source beam. The plural optical lens groups, the optical sensor and the lighting member are accommodated within the casing. The optical apparatus has a single optical lens module, and is able to implement different optical functions simultaneously. Consequently, the overall volume of the optical apparatus is minimized, the fabricating cost of the optical apparatus is reduced, the assembling process is simplified, and the number of components to be assembled is reduced.

15 Claims, 5 Drawing Sheets

(56) References Cited

U.S. PATENT DOCUMENTS

| | | | |
|---|---|---|---|
| 2010/0085466 A1* | 4/2010 | Fujimori | H04N 5/335 |
| | | | 348/340 |
| 2010/0309368 A1* | 12/2010 | Choi | H04N 5/2254 |
| | | | 348/360 |
| 2012/0026093 A1* | 2/2012 | Duparre | G06F 3/03547 |
| | | | 345/166 |
| 2015/0036046 A1* | 2/2015 | Rudmann | H04N 5/2252 |
| | | | 348/374 |

* cited by examiner

OPTICAL APPARATUS

FIELD OF THE INVENTION

The present invention relates to an optical apparatus, and more particularly to an optical image capturing apparatus with a lighting function.

BACKGROUND OF THE INVENTION

FIG. 1 schematically illustrates the structure of a conventional image capturing unit. As shown in FIG. 1, the image capturing unit 1 comprises an optical lens group 11, an image sensor 12 and a casing 13. The optical lens group 11 comprises at least one lens for collecting the light beams from one object to pass through. After the light beam passing through the optical lens group 11 is sensed by the image sensor 12, the light beam is converted into an image pattern (signal) by the image sensor 12. According to the imaging signal, a corresponding image is shown on a display device. The optical lens group 11 and the image sensor 12 are accommodated within the casing 13 and securely and firmly positioned in the casing (housing) 13. Consequently, the optical lens group 11 and the image sensor 12 can be normally operated. In FIG. 1, the individual image capturing unit 1 is shown. However, since the current optical technology is constantly developed, the image capturing unit 1 can be minimized and installed in a portable electronic communication product.

Moreover, the image capturing unit 1 of FIG. 1 is only able to capture a single image in each capturing process. Nevertheless, when the demand is to have multiple images simultaneously, a direct approach is to have multiple units which may be too cumbersome. For solving this drawbacks, plural image capturing units 1 are combined together in order to capture plural images at the same time.

FIG. 2 schematically illustrates the structure of a conventional array-type image capturing apparatus. As shown in FIG. 2, the array-type image capturing apparatus 2 comprises a frame 21 and plural image capturing units 1. The plural image capturing units 1 are in an array arrangement and in a rectangular distribution through the frame 21. Moreover, the image signals corresponding to the images acquired by the plural image capturing units 1 are transmitted to a back-end processor (not shown). After the image signals are integrated and processed by the back-end processor, the integrated image is shown on a display device.

Generally, the array-type image capturing apparatus 2 is able to capture plural images in each capturing process. However, the optical functions provided by the plural image capturing units 1 are identical. For example, the optical axes of the plural image capturing units 1 are along the same direction. That is, there is no inclined angle between any two optical axes. Alternatively, all image capturing units 1 have the same field of view (FOV) or the same effective focal length (efl).

Due to the limitations of the fabricating process of the current array-type image capturing apparatus 2, the imaging quality of the image capturing unit 1 is usually insufficient. For example, the image capturing unit 1 usually has a resolution of 1M~2M pixels only. Under this circumstance, the function provided by the array-type image capturing apparatus 2 is limited. Moreover, since the array arrangement of the array-type image capturing apparatus 2 is complicated and plural image capturing units 1 are contained in the array-type image capturing apparatus 2, the applications thereof are restricted because of the high cost.

The development of current array type image capturing apparatus are also achieved by wafer-level optics and hence, the lenses are with the same principal planes and hence the same effective focal length and this actually become a restriction on the lens design. It is actually not easy to keep all array elements to have exactly the same effective focal length practically in fabrication/production.

FIG. 3 schematically illustrates the structure of another conventional image capturing apparatus. As shown in FIG. 3, the image capturing apparatus 9 comprises plural lens modules 91 and a casing 92. The lens modules 91 are fixed by the casing 92. Each lens module 91 comprises an optical lens group 911 and an optical sensor (not shown). Moreover, the image signals corresponding to the images acquired by the plural lens modules 91 are transmitted to a processor (not shown). The processor may be built in the casing 92. After the image signals are integrated and processed by the processor, a three-dimensional image is produced or shown on a display device. Likewise, the image capturing apparatus 9 is able to capture plural images in each capturing process. However, since plural optical sensors are installed within the casing 92, the volume reduction of the image capturing apparatus 9 is not obvious.

Regardless of whether the image capturing apparatus comprises a single image capturing unit or plural image capturing units, the aperture is reduced when the imaging quality of the image capturing apparatus is taken into consideration. The reduction of the aperture can increase the sharpness of the image that is acquired by the image capturing apparatus. However, if the aperture is too small, the luminance for the image capturing apparatus is insufficient. Under this circumstance, the overall performance of the image capturing apparatus is deteriorated. The aperture is related to the concept of f-number. It means that it is always difficult to have small F/# (f-number) for image-taking device in general.

FIG. 4 schematically illustrates the structure of another conventional image capturing apparatus with a flash lamp. As shown in FIG. 4, the flash lamp 7 is an individual component. The flash lamp 7 may be independently located at the outside of the image capturing apparatus 8, or the flash lamp 7 may be combined with the image capturing apparatus 8. During the process of capturing the image, the flash lamp 7 provides luminance to the operating environment of the image capturing apparatus 8. Consequently, the imaging quality is enhanced. However, since the flash lamp 7 occupies a lot of space, the use of the flash lamp 7 cannot effectively reduce the overall volume of the image capturing apparatus 8.

Therefore, while both of the overall volume and the fabricating cost are taken into consideration, it is an important issue to allow the image capturing apparatus to capture plural images in each capturing process and allow the image capturing apparatus to flexibly provide different optical functions to achieve required optical efficacy according to the practical requirements and acquire required luminance for capturing images in various situations (e.g., the situation that the aperture is reduced).

SUMMARY OF THE INVENTION

For solving the drawbacks of the conventional technology, the present invention provides an optical apparatus. The optical apparatus has a single optical lens module, and is able to implement different optical functions simultaneously. Consequently, the overall volume of the optical apparatus is minimized, and the fabricating cost of the optical apparatus is reduced. Moreover, the process of assembling the optical apparatus is simplified, and the number of components to be assembled is reduced.

For solving the drawbacks of the conventional technology, the present invention provides an optical apparatus. The optical apparatus can provide proper luminance to the operating environment so as to comply with the luminance requirement of the optical sensor. Consequently, the imaging quality and performance of the optical apparatus will be enhanced.

In accordance with an aspect of the present invention, there is provided an optical apparatus. The optical apparatus includes plural optical lens groups, an optical sensor, at least one lighting member and a casing. After a light beam passes through any of the plural optical lens groups, a travelling direction of the light beam is changed. After the light beam passes through at least one of the plural optical lens groups, the light beam is sensed by the optical sensor. The at least one lighting member outputs a source beam. The plural optical lens groups, the optical sensor and the at least one lighting member are accommodated and fixed within the casing.

In an embodiment, the source beam from the at least one lighting member is a light beam for providing lighting luminance and/or a structured light.

In an embodiment, the optical apparatus satisfies a mathematic formula:

$$B_w \geq 0.6 \cdot E_w \cdot (F/\#_w)^2$$

wherein $B_w$ is a total luminance value of the source beam from at least one the lighting member and with a wavelength w, $E_w$ is a luminance value of the source beam with the wavelength w that is required for the optical sensor, and $F/\#_w$ is a f-number of the optical lens group that the source beam with the wavelength passes through.

In an embodiment, the optical apparatus satisfies a mathematic formula:

$$B_w \geq 0.5 \times \left(\frac{f}{R}\right)^2 \times E_w$$

wherein $B_w$ is a total luminance value of the source beam from at least one the lighting member and with a wavelength w, $E_w$ is a luminance value of the source beam with the wavelength w that is required for the optical sensor, and f is the effective focal length of the optical lens group that the source beam with the wavelength passes through and the R is the corresponding radius of opening. This shows an alternative representation of the minimum luminance required to perform superior imaging.

In an embodiment, each lighting member includes a light source and an obstructer, and the obstructer is arranged between the light source and the optical sensor. The source beam from the light source is blocked from being transmitted to the optical sensor by the obstructer.

In an embodiment, the light source includes a laser diode (LD), a light emitting diode (LED) and/or an organic light emitting diode (OLED). The light source emits the source beam, and the source beam has a wavelength in a first wavelength range, a second wavelength range and/or a thermal band.

In an embodiment, one of the plural optical lens groups is a center optical lens group, and the other optical lens groups of the plural optical lens groups are peripheral optical lens groups around the center optical lens group.

In an embodiment, the optical apparatus satisfies mathematic formulae:

$$0.6 < \frac{f_c}{f_{e,j}} < 2.0, \frac{f_c}{F/\#} < 2.5, \text{ and } \frac{f_c}{f_{e,j}} \sim \frac{FOV_{e,j}}{FOV_c}$$

wherein $f_c$ is an effective focal length of the center optical lens group, $f_{e,j}$ is an effective focal length of a j-th peripheral optical lens group, and F/# is a f-number of the center optical lens group. $FOV_c$ is used to denote the FOV of central lens group while $FOV_{e,j}$ is for a j-th peripheral optical lens group. To maintain a minimum opening for the total of the lens groups, when the central portion is with larger FOV, the corresponding $f_c$ will be smaller. On the other hand, when the central portion is with a smaller $FOV_c$, the corresponding $f_c$ will be larger.

In an embodiment, an inclined angle between a center optical axis of the center optical lens group and a peripheral optical axis of at least one of the plural peripheral optical lens groups is smaller than 20 degrees.

In an embodiment, an inclined angle between a center optical axis of the center optical lens group and a peripheral optical axis of at least one of the plural peripheral optical lens groups is more than 20 degrees when the corresponding lens groups are embedding with reflective optical elements.

In an embodiment, the at least one lighting member is disposed within at least one of the plural optical lens groups, or the at least one lighting member is arranged between at least one of the peripheral optical lens groups and the optical sensor.

In an embodiment, the optical apparatus according to claim further includes at least one filter. The at least one filter is arranged between the plural optical lens groups and the optical sensor. After the light beam passes through any of the plural optical lens groups, a portion of the light beam is filtered and sieved by the at least one filter.

In an embodiment, a visible light beam, an infrared light beam, a near infrared light beam and/or a far infrared light beam is blocked by the at least one filter.

In an embodiment, the optical apparatus further includes a light shielding plate. The light shielding plate is located at front sides of the plural optical lens groups, and the light shielding plate has plural perforations corresponding to the plural optical lens groups.

In an embodiment, plural optical lens groups include a visible optical lens group and an invisible optical lens group. After at least one visible light beam passes through the visible optical lens group, a travelling direction of the at least one visible light beam is changed. After at least one invisible light beam passes through the invisible optical lens group, a travelling direction of the at least one invisible light beam is changed.

In an embodiment, the plural optical lens groups include a first optical lens group with a first lens and a second optical lens group with a second lens, wherein the first lens and the second lens are integrally formed with each other.

In an embodiment, each of the plural optical lens groups comprises a single lens or plural lenses in a stack arrangement, wherein each lens is made of a plastic material, a glass material or a silicon-based material.

In an embodiment, the optical apparatus is an optical image capturing apparatus.

From the above descriptions, the present invention provides the optical apparatus. The plural optical lens groups of the optical apparatus are designed according to different optical functions For example, the optical functions include a wide-angle imaging function, a non-wide angle imaging function, a long-distance imaging function and a short-distance imaging function. Moreover, the plural optical lens groups are fixed in the same casing, and the same optical sensor is shared by the plural optical lens groups. Consequently, the optical apparatus of the present invention has a single optical lens module, and is able to implement different optical functions simultaneously. For example, the optical apparatus can acquire plural images corresponding to different optical functions in each capturing process. For example, the optical apparatus can acquire plural images corresponding to different optical functions in each capturing process. Consequently, the overall volume of the optical apparatus is minimized, and the fabricating cost of the optical apparatus is reduced. Moreover, the optical apparatus further comprises a lighting member for providing proper luminance to the operating environment so as to comply with the luminance requirement of the optical sensor. Moreover, the lighting member and the optical sensor are collaboratively accommodated within the casing. Consequently, the overall volume of the optical apparatus is minimized, and the imaging quality and performance of the optical apparatus are enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
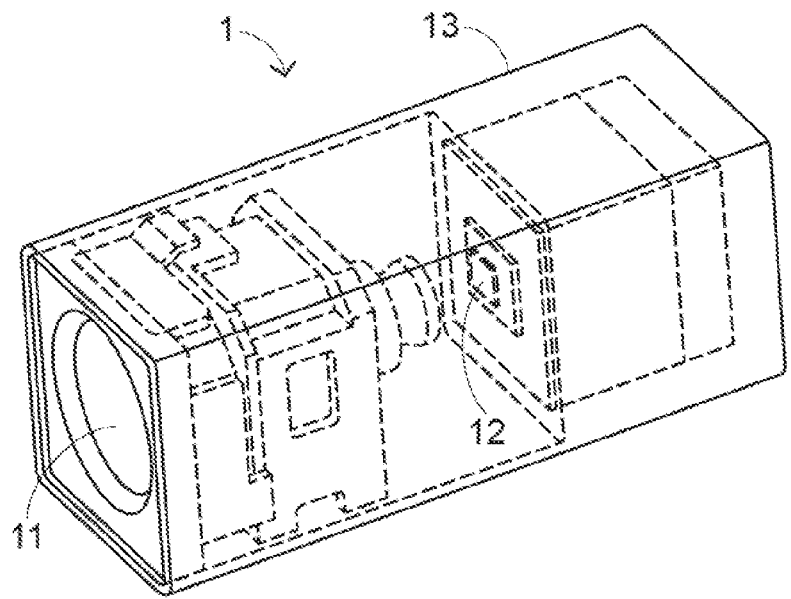
FIG. 1 schematically illustrates the structure of a conventional image capturing unit.
Figure 2:
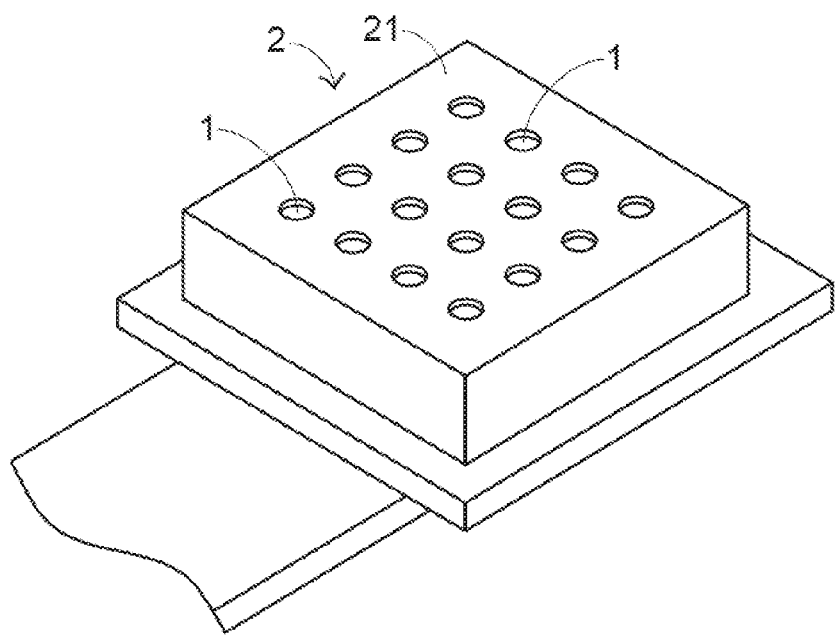
FIG. 2 schematically illustrates the structure of a conventional array-type image capturing apparatus.
Figure 3:
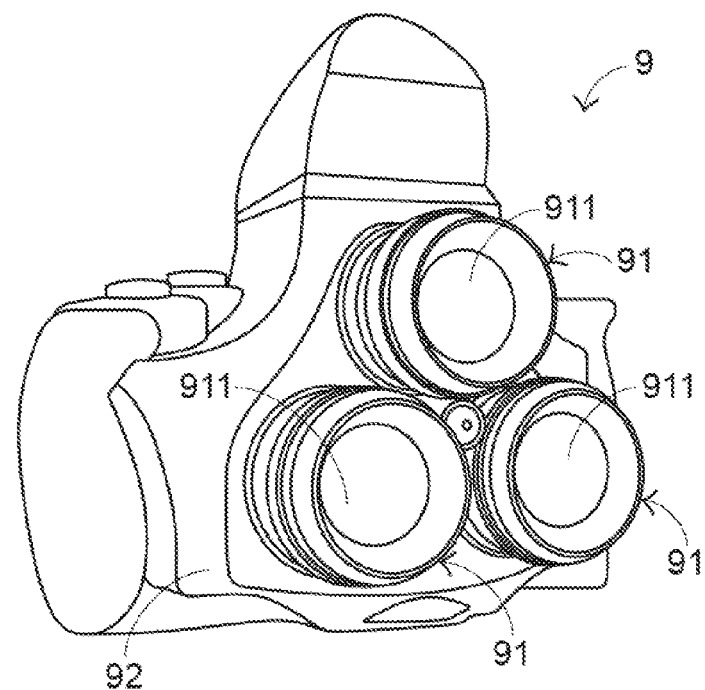
FIG. 3 schematically illustrates the structure of another conventional image capturing apparatus.
Figure 4:
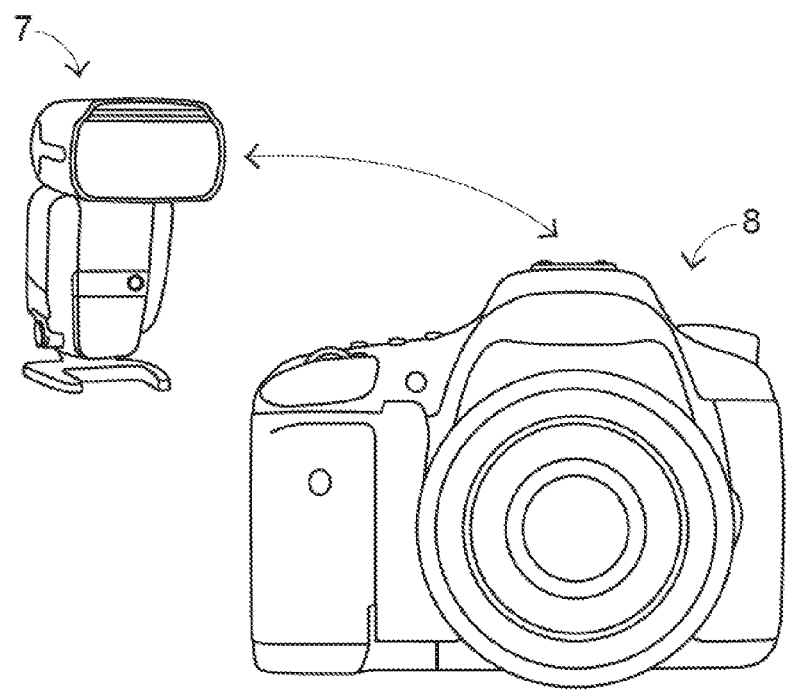
FIG. 4 schematically illustrates the structure of another conventional image capturing apparatus with a flash lamp.
Figure 5:
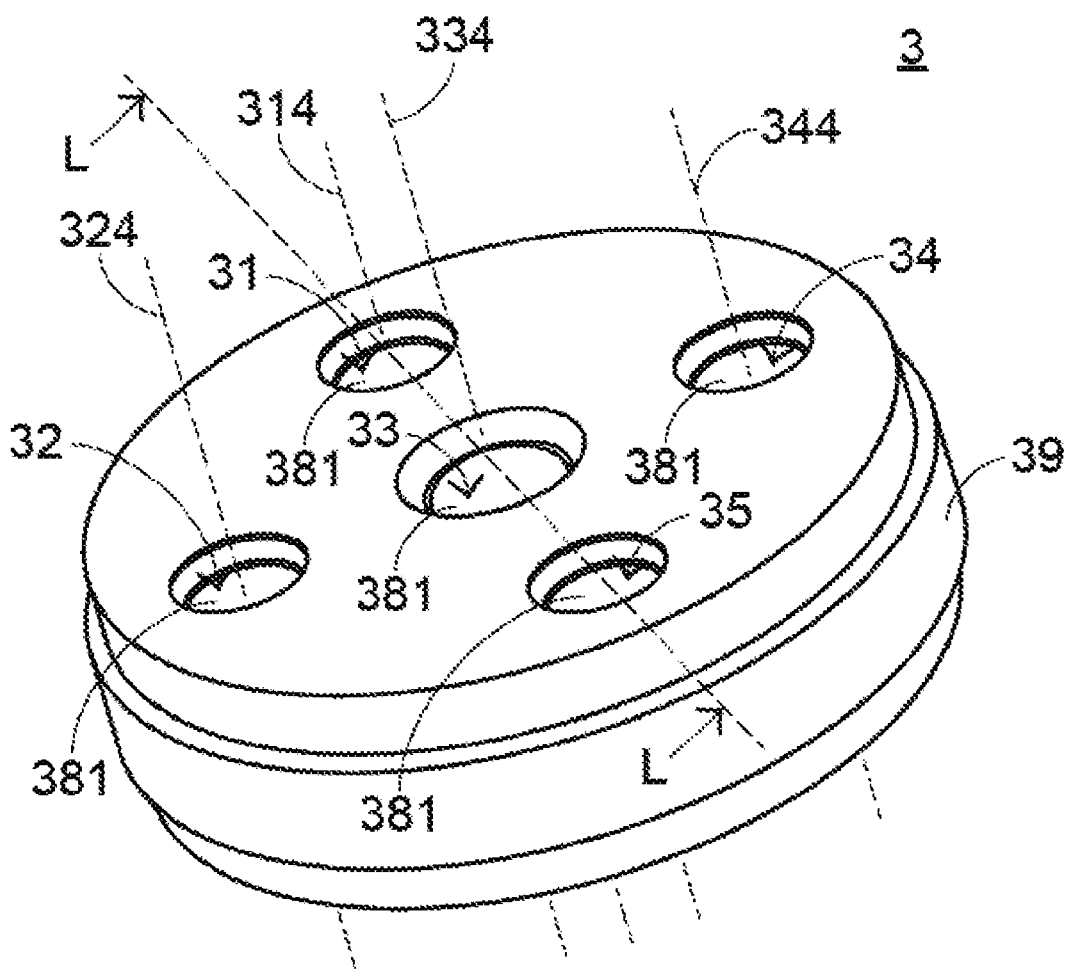
FIG. 5 is a schematic perspective view illustrating the outer appearance of an optical apparatus according to a first embodiment of the present invention.
Figure 6:
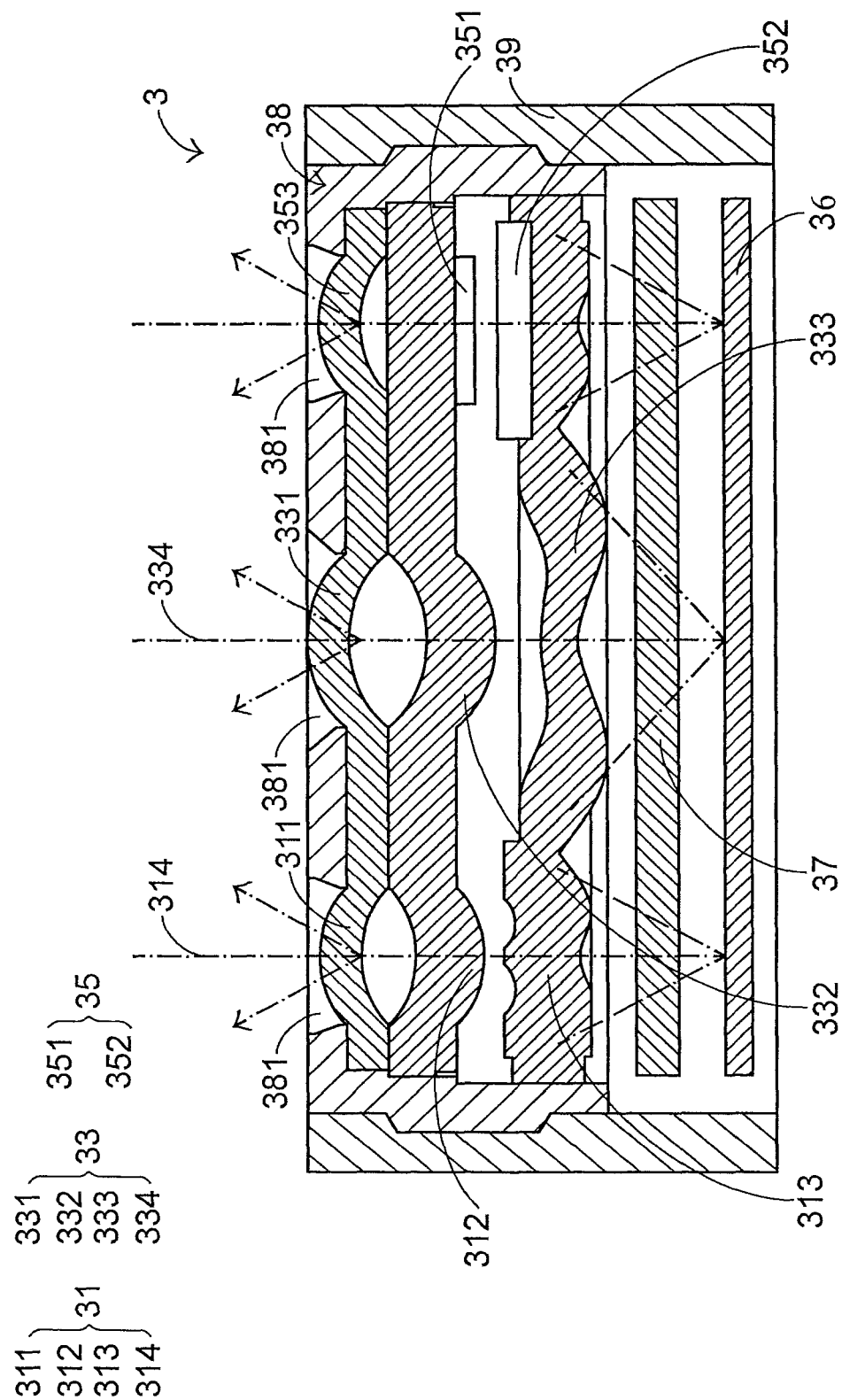
FIG. 6 is a schematic cross-sectional view illustrating a portion of the optical apparatus of FIG. 5 and taken along the line L-L.

Please refer to FIGS. 5 and 6. FIG. 5 is a schematic perspective view illustrating the outer appearance of an optical apparatus according to a first embodiment of the present invention. FIG. 6 is a schematic cross-sectional view illustrating a portion of the optical apparatus of FIG. 5 and taken along the line L-L. In this embodiment, the optical apparatus 3 is an optical image capturing apparatus. The optical apparatus 3 comprises a first optical lens group 31, a second optical lens group 32, a third optical lens group 33, a fourth optical lens group 34, a lighting member 35, an optical sensor 36, a filter 37, a light shielding plate 38 and a casing 39. The optical lens groups 31~34, the lighting member 35, the optical sensor 36, the filter 37 and the light shielding plate 38 are accommodated within the casing 39. The first optical lens group 31 comprises a first lens 311, a third lens 312 and a fifth lens 313, which are sequentially arranged along the direction of a first optical axis 314. The second optical lens group 33 comprises a second lens 331, a fourth lens 332 and a sixth lens 333, which are sequentially arranged along the direction of a third optical axis 334. Similarly, the second optical lens group 32 comprises plural lenses (not shown), which are sequentially arranged along the direction of a second optical axis 324, and the fourth optical lens group 34 comprises plural lenses (not shown), which are sequentially arranged along the direction of a fourth optical axis 344. The arrangement sequences of the lenses of the second optical lens group 32 and the fourth optical lens group 34 are identical to or different from the arrangement sequences of the lenses of the first optical lens group 31 or the second optical lens group 33.

Moreover, when light beams pass through any of the optical lens groups 31~34, the travelling directions of the light beams are changed. After the light beams pass through any of the optical lens groups 31~34, the light beams are received by the optical sensor 36 and converted into an image signal by the optical sensor 36. The image signal is processed by a signal processor (not shown) or shown on a display device (not shown).

Moreover, each lens is made of a plastic material, a glass material or a silicon-based material. As shown in FIG. 6, each of the first optical lens group 31 and the third optical lens group 33 comprises plural lenses, which are in a stack arrangement. It is noted that the number of lenses is not restricted. For example, in some embodiments, each of the optical lens groups 31~34 only comprises a single lens.

Preferably but not exclusively, the first lens 311 of the first optical lens group 31, the second lens 331 of the third optical lens group 33, the corresponding lens of the second optical lens group 32 and the corresponding lens of the fourth optical lens group 34 are connected with each other. That is, these lenses are integrally formed on a single transparent structure. Similarly, the third lens 312 of the first optical lens group 31, the fourth lens 332 of the third optical lens group 33, the corresponding lens of the second optical lens group 32 and the corresponding lens of the fourth optical lens group 34 are connected with each other. That is, these lenses are integrally formed. Similarly, the fifth lens 313 of the first optical lens group 31, the sixth lens 333 of the third optical lens group 33, the corresponding lens of the second optical lens group 32 and the corresponding lens of the fourth optical lens group 34 are connected with each other. That is, these lenses are integrally formed with each other.

Since the corresponding lenses of the optical lens groups 31~34 are integrally formed with each other, the optical apparatus 3 can be assembled more easily. Moreover, since the optical apparatus 3 has the advantage of miniaturization, the optical apparatus 3 can be applied to a handheld mobile device such as a mobile phone, a tablet computer or any other wearable device.

The light shielding plate 38 is located at the front sides of the optical lens groups 31~34. Moreover, the light shielding plate 38 has plural perforations 381 corresponding to the optical lens groups 31~34. That is, the optical lens groups 31~34 are exposed outside through the corresponding perforations 381. Consequently, the ambient light beams can be introduced into the optical lens groups 31~34. The light shielding plate 38 is used for sheltering the surrounding stray light around the optical lens groups 31~34. Consequently, the optical resolution of the light beams to be sensed by the optical sensor 36 will be enhanced.

The filter 37 is arranged between the optical lens groups 31~34 and the optical sensor 36. After the light beams pass through the optical lens groups 31~34, portions of the light beams are filtered and sieved by the filter 37. Consequently, the light beams received by the optical sensor 36 are useful light beams. For example, according to the practical requirements, the filter 37 is designed to block visible light beams, infrared light beams, near infrared light beams and/or far infrared light beams.

In this embodiment, the third optical lens group 33 is a center optical lens group, and the first optical lens group 31, the second optical lens group 32 and the fourth optical lens group 34 are peripheral optical lens groups around the center optical lens group. That is, these peripheral optical lens groups are arranged around the center optical lens group 33.

Moreover, these optical lens groups 31~34 have respective effective focal lengths (EFL). Since the optical lens groups 31~34 may comprise different numbers and/or different optical properties of lenses, the effective focal lengths of any two optical lens groups are identical or different. In an embodiment, $f_c$ is an effective focal length of the center optical lens group (i.e., the effective focal length of the third optical lens group 33), $f_{e,j}$ is an effective focal length of the j-th peripheral optical lens group (i.e., $f_{e,1}$ is the effective focal length of the first optical lens group 31, $f_{e,2}$ is the effective focal length of the second optical lens group 32, and $f_{e,3}$ is the effective focal length of the fourth optical lens group 34), and F/# is a f-number of the center optical lens group (i.e., the f-number of the third optical lens group 33). Moreover, the optical apparatus 3 satisfies the following mathematic formulae:

$$0.6 < \frac{f_c}{f_{e,j}} < 2.0, \frac{f_c}{F/\#} < 2.5, \text{ and } \frac{f_c}{f_{e,j}} \sim \frac{FOV_{e,j}}{FOV_c}$$

$FOV_c$ is used to denote the FOV of central lens group while $FOV_{e,j}$ is for a j-th peripheral optical lens group. To maintain a minimum opening for the total of the lens groups, when the central portion is with larger FOV, the corresponding $f_c$ will be smaller. On the other hand, when the central portion is with a smaller $FOV_c$, the corresponding $f_c$ will be larger.

That is, the quotient of the effective focal length of the third optical lens group 33 divided by the effective focal length of the first optical lens group 31, the second optical lens group 32 or the fourth optical lens group 34 is in the range between 0.6 and 1.2, and the quotient of the effective focal length of the third optical lens group 33 divided by the f-number of the third optical lens group 33 is smaller than 2.5. Consequently, the performance of converting the received light beam into the image signal by the optical sensor 36 will be enhanced.

Preferably but not exclusively, the inclined angle between the third optical axis 334 of the third optical lens group 33 and each of the first optical axis 314 of the first optical lens group 31, the second optical axis 324 of the second optical lens group 32 and the fourth optical axis 344 of the fourth optical lens group 34 is smaller than 20 degrees. That is, the inclined angle between the center optical lens group and any peripheral optical lens group is smaller than 20 degrees. Consequently, the imaging performance of the optical apparatus 3 is enhanced. When the tilted angle is required to be larger than 20 degrees, additional reflective optical elements can be embedded to achieve the specification. The inclination of optical axes is achieved, e.g., by having one prism element or reflective mirror element in between lens elements 331 and 312. In this case, the optical axis 314 is tilted, and to have less optical aberration, the lens element 331 is also tilted correspondingly. The barrel 38 is also partially modified to hold the lens element 311 respectively such that the optical axis 314 can have the inclined angle as specified, e.g., 20 degrees, and hence the total field of view can be enlarged greatly as one example of application.

Optionally, one of the plural optical lens groups 31~34 is a visible optical lens group and another of the plural optical lens groups 31~34 is an invisible optical lens group. After a visible light beam passes through the visible optical lens group, a travelling direction of the visible light beam is changed. After an invisible light beam passes through the invisible optical lens group, a travelling direction of the invisible light beam is changed.

It is acknowledged that if the luminance of the operating environment of the optical apparatus 3 is insufficient or the aperture of any of the optical lens groups 31~34 is too small, the luminance of the light beam to enter into the optical sensor 36 will be insufficient for the optical sensor 36 to perform well. Thus, in the present invention, the lighting member 35 is used for providing proper luminance to the operating environment of the optical apparatus 3 so as to comply with the luminance requirement of the optical sensor 36 and enhance the performance of converting the received light beam into the image signal by the optical sensor 36 Accordingly, the imaging performance and function of the optical apparatus 3 will be enhanced by equipping the lighting member 35.

In this embodiment, the lighting member 35 comprises a light source 351 and an obstructer 352, which are in a stack arrangement. The obstructer 352 is arranged between the light source 351 and the optical sensor 36. By the obstructer 352, the light beam (also referred as a source beam) emitted by the light source 351 is blocked from being transmitted to the optical sensor 35. Consequently, the light beam emitted by the light source 351 is only permitted to be outputted to the surroundings of the optical apparatus 3 in a single direction. In another embodiment, the lighting member 35 further comprises a diffractive optical element (not shown) according to the practical requirements. After the light beam emitted by the light source 351 passes through the diffractive optical element, a structured light is outputted from the optical apparatus 3.

For example, the light source 351 comprises a laser diode (LD), a light emitting diode (LED), an organic light emitting diode (OLED), or any other comparable semiconductor-type light-emitting element similar to the laser diode, the light emitting diode or the organic light emitting diode. The wavelength of the light beam from the light source 351 is in a first wavelength range and/or a second wavelength range. For example, the light beam from the light source 351 is a visible beam, an invisible beam or a light beam in a thermal band.

Optionally, the lighting member 35 further comprises an optical component that cooperatively works with the light source 351. For example, the optical component is a lens 353. The lens 353 is connected with the first lens 311 of the first optical lens group 31 and the second lens 331 of the third optical lens group 33. After the light beam from the lighting member 35 passes through the lens 353, a travelling direction of the light beam is changed.

Preferably but not exclusively, $B_w$ is the total luminance value of the light beam from the lighting member 35 and with a wavelength w, $E_w$ is the luminance value of the light beam with the wavelength w that is required for the optical sensor 36, and $F/\#_w$ is a f-number of the center optical lens group that the light beam with the wavelength passes through. Moreover, the optical apparatus 3 satisfies the following mathematic formula:

$$B_w \geq 0.6 \cdot E_w \cdot (F/\#_w)^2$$

The required luminance can be rewritten as $$B_w \geq 0.5 \times \left(\frac{f}{R}\right)^2 \times E_w$$

Wherein $B_2$ is a total luminance value of the source beam from at least one the lighting member and with a wavelength w, $E_w$ is a luminance value of the source beam with the wavelength w that is required for the optical sensor, and f is the effective focal length of the optical lens group that the source beam with the wavelength passes through and the R is the corresponding radius of opening. This shows an alternative representation of the minimum luminance required to perform superior imaging.

According to the above mathematic formula, the lighting member 35 provides the proper luminance to the operating environment of the optical apparatus 3 so as to comply with the luminance requirement of the optical sensor 36. This shows a minimum luminance required to perform superior sensitivity. Consequently, the imaging performance and function of the optical apparatus 3 will be enhanced.

Figure 7:
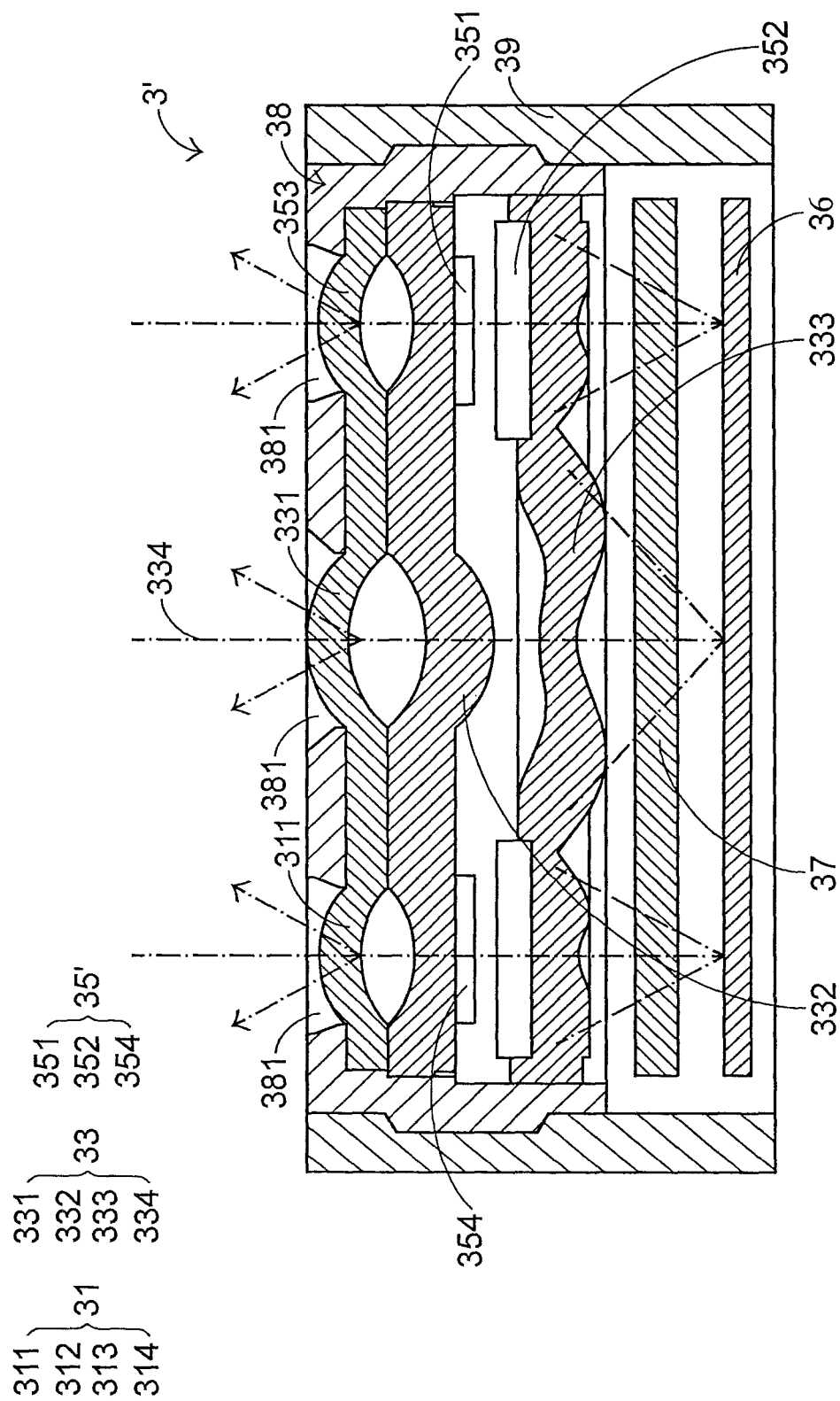
FIG. 7 is a schematic cross-sectional view illustrating a portion of an optical apparatus according to a second embodiment of the present invention.

FIG. 7 is a schematic cross-sectional view illustrating a portion of an optical apparatus according to a second embodiment of the present invention. The components of the optical apparatus 3' of this embodiment which are similar to the optical device of the first embodiment are not redundantly described herein. In the first embodiment, the lighting member 35 comprises a single light source 351. Whereas, the lighting member 35' of the optical apparatus 3' of this embodiment comprises plural light sources 351 and 354.

It is noted that the present invention is limited to the above embodiment. Those skilled in the art will readily observe that numerous modifications and alterations may be made while retaining the teachings of the invention. For example, in a variant example, the optical apparatus is not equipped with the filter 37. In another variant example, the optical apparatus is not equipped with the light shielding plate 38. In the above embodiments, the light shielding plate 38 is located at the front sides of the optical lens groups. In some other embodiments, the light shielding plate 38 is located at another proper position of the optical apparatus. For example, the light shielding plate 38 is arranged between two optical lens groups, or the light shielding plate 38 is arranged between two lenses of a specified optical lens group.

In the above embodiments, the optical apparatus comprises a single filter 37. In some other embodiments, the optical apparatus comprises plural filters corresponding to plural optical lens groups. Optionally, according to the special requirements, any two filters are designed to block the same kind of light beams or block different kinds of light beams.

In the above embodiment, the plural optical lens groups of the optical apparatus are specially designed. That is, the peripheral optical lens groups are arranged around the center optical lens group. It is noted that the distribution of the plural optical lens groups is not restricted. For example, in some other embodiments, the plural optical lens groups are in a rectangular distribution.

From the above descriptions, the present invention provides the optical apparatus. The plural optical lens groups of the optical apparatus are designed according to different optical functions For example, the optical functions include a wide-angle imaging function, a non-wide angle imaging function, a long-distance imaging function and a short-distance imaging function. Moreover, the plural optical lens groups are fixed in the same casing, and the same optical sensor is shared by the plural optical lens groups. Consequently, the optical apparatus of the present invention has a single optical lens module, and is able to implement different optical functions simultaneously. For example, the optical apparatus can acquire plural images corresponding to different optical functions in each capturing process. Consequently, the overall volume of the optical apparatus is minimized, and the fabricating cost of the optical apparatus is reduced. Moreover, the process of assembling the optical apparatus is simplified, and the number of components to be assembled is reduced.

Moreover, the optical apparatus further comprises a lighting member for providing proper luminance to the operating environment so as to comply with the luminance requirement of the optical sensor. Moreover, the lighting member and the optical sensor are collaboratively accommodated within the casing. Consequently, the overall volume of the optical apparatus is minimized, and the imaging quality and performance of the optical apparatus are enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus, comprising:
   plural optical lens groups, wherein after a light beam passes through any of the plural optical lens groups, a travelling direction of the light beam is changed, wherein one of the plural optical lens groups is a center optical lens group, and the other optical lens groups of the plural optical lens groups are peripheral optical lens groups around the center optical lens group;
   an optical sensor, wherein after the light beam passes through at least one of the plural optical lens groups, the light beam is sensed by the optical sensor;
   at least one lighting member outputting a source beam; and
   a casing, wherein the plural optical lens groups, the optical sensor and the at least one lighting member are accommodated and fixed within the casing, wherein the optical apparatus satisfies mathematic formula:

$$0.6 < \frac{f_c}{f_{e,j}} < 2.0, \quad \frac{f_c}{F/\#} < 2.5, \text{ and } \frac{f_c}{f_{e,j}} \sim \frac{FOV_{e,j}}{FOV_c}$$

wherein $f_c$ is an effective focal length of the center optical lens group, $f_{e,j}$ is an effective focal length of a j-th peripheral optical lens group, and $F/\#$ is a f-number of the center optical lens group, FOV is used to denote the field of view and the index c, e,j are used to denoted the corresponding optical lens groups.

2. The optical apparatus according to claim 1, wherein the source beam from the at least one lighting member is a light beam for providing lighting luminance and/or a structured light.

3. The optical apparatus according to claim 1, wherein the optical apparatus satisfies a mathematic formula:

$$B_w \geq 0.5 \times \left(\frac{f}{R}\right)^2 \times E_w$$

wherein $B_w$ is a total luminance value of the source beam from at least one the lighting member and with a wavelength w, $E_w$ is a detectable luminance value of the source beam with the wavelength w by the optical sensor, f is an effective focal length of the optical lens group that the source beam with the wavelength passes through and the R is the corresponding radius of the opening or aperture.

4. The optical apparatus according to claim 1, wherein each lighting member comprises a light source and an obstructer, and the obstructer is arranged between the light source and the optical sensor, wherein the source beam from the light source is blocked from being transmitted to the optical sensor by the obstructer.

5. The optical apparatus according to claim 4, wherein the light source comprises a laser diode, a light emitting diode and/or an organic light emitting diode, wherein the light source emits the source beam, and the source beam has a wavelength in a visible wavelength range, an invisible wavelength range and/or a thermal band.

6. The optical apparatus according to claim 1, wherein an inclined angle between a center optical axis of the center optical lens group and a peripheral optical axis of at least one of the plural peripheral optical lens groups is smaller than 20 degrees.

7. The optical apparatus according to claim 1, wherein reflective optical elements are embedded in the corresponding optical lens group and an inclined angle between a center optical axis of the center optical lens group and a peripheral optical axis of at least one of the plural peripheral optical lens groups is more than 20 degrees.

8. The optical apparatus according to claim 1, wherein the at least one lighting member is disposed within at least one of the plural optical lens groups, or the at least one lighting member is arranged between at least one of the peripheral optical lens groups and the optical sensor.

9. The optical apparatus according to claim 1, further comprising at least one filter, wherein the at least one filter is arranged between the plural optical lens groups and the optical sensor, wherein after the light beam passes through any of the plural optical lens groups, a portion of the light beam is filtered and sieved by the at least one filter.

10. The optical apparatus according to claim 9, wherein a visible light beam, an infrared light beam, a near infrared light beam and/or a far infrared light beam is blocked by the at least one filter.

11. The optical apparatus according to claim 1, further comprising a light shielding plate, wherein the light shielding plate is located at front sides of the plural optical lens groups, and the light shielding plate has plural perforations corresponding to the plural optical lens groups.

12. The optical apparatus according to claim 1, wherein plural optical lens groups comprise a visible optical lens group and an invisible optical lens group, wherein after at least one visible light beam passes through the visible optical lens group, a travelling direction of the at least one visible light beam is changed, wherein after at least one invisible light beam passes through the invisible optical lens group, a travelling direction of the at least one invisible light beam is changed.

13. The optical apparatus according to claim 1, wherein the plural optical lens groups comprise a first optical lens group with a first lens and a second optical lens group with a second lens, wherein the first lens and the second lens are integrally formed with each other.

14. The optical apparatus according to claim 1, wherein each of the plural optical lens groups comprises a single lens or plural lenses in a stack arrangement, wherein each lens is made of a plastic material, a glass material or a silicon-based material.

15. The optical apparatus according to claim 1, wherein the optical apparatus is an optical image capturing apparatus.

* * * * *